United States Patent Office 3,136,768
Patented June 9, 1964

3,136,768
8-(BENZOYLOXY)-QUINOLINES
Rudolf Griot, Jany Renz, Jean-Pierre Bourquin, and Erhard Schenker, Basel, Switzerland, assignors to Sandoz Ltd., Basel, Switzerland
No Drawing. Filed Feb. 23, 1962, Ser. No. 175,346
13 Claims. (Cl. 260—287)

The present invention relates to novel 8-hydroxy quinoline derivatives of the Formula I

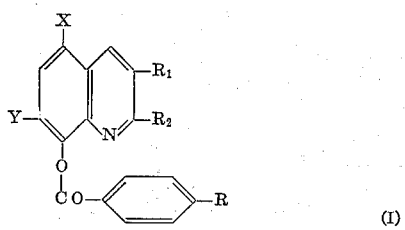

wherein R is a radical selected from the group consisting of hydrogen, halogen and $NO_2$, each of $R_1$ and $R_2$ is a radical selected from the group consisting of hydrogen and methyl, with the proviso that $R_1$ and $R_2$ need not be dissimilar, Y is a radical selected from the group consisting of hydrogen, chlorine and bromine and X is a radical selected from the group consisting of chlorine and bromine; it is a continuation-in-part of our copending applications, Serial No. 75,470, filed December 13, 1960, Serial No. 98,335, filed May 27, 1961, Serial No. 105,912, filed April 27, 1961, Serial No. 109,504, filed May 12, 1961, each of these copending applications being now abandoned.

In one aspect thereof, the present invention provides esters of 5,7-dihalogeno-8-hydroxyquinaldines of the Formula II

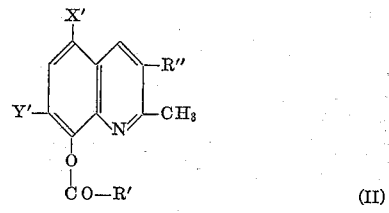

wherein R' is a radical of the group consisting of hydrogen, alkyl containing 1 to 5 carbon atoms and phenyl and phenyl substituted with a monovalent substituent, and R" is a radical selected from the group consisting of hydrogen and methyl, and each of X' and Y' is a radical selected from the group consisting of chlorine, bromine and iodine, with proviso that X' and Y' need not be dissimilar.

The above compounds of Formula II are prepared by reacting as starting material 5,7-dihalogeno-8-hydroxyquinaldine of the general Formula III

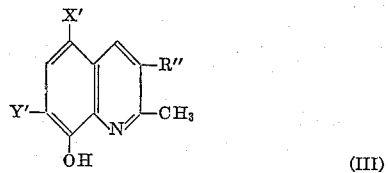

wherein R", X' and Y' have the above significance, with an acylating agent selected from the group consisting of acid anhydride of the Formula IVa $$(R'CO)_2O \qquad (IVa)$$

wherein R' has the above significance; an acid chloride of the general Formula IVb $$R'COCl \qquad (IVb)$$

wherein R' has the above significance and a mixture of acylating agent of Formulae IVa and IVb.

The starting materials III above may be prepared as follows:

(a) *When X' and Y' are similar halogen radicals.*—Direct halogenation of a quinaldine of the Formula A below introduces halogen into positions 5 and 7 of the quinaldine ring in Formula A

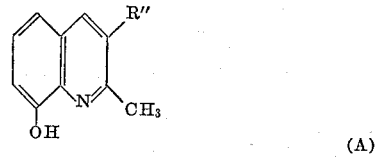

wherein R" has the above significance. Halogenation is carried out conveniently with a known chlorination, bromination or iodination agent by methods known per se ("known" designating a method in actual use or described in the literature).

(b) *When X' and Y' are dissimilar.*—Selective monoholagenation in position 5 of the above Compound A may be carried out in a first step with the calculated amount of known chlorination, bromination or iodination agents to provide the mono-halo compound and in a second step monohalogenation of the resulting monohalogenated compound occurs in position 7 with the required halogenation agent. The conditions employed follow methods known per se for halogenation.

The process may then be carried out in a specific example by heating the 5,7-dihalogeno-8-hydroxyquinaldine with an acid anhydride of Formula IVa in the presence of an acylation catalyst, for example, concentrated sulfuric acid or pyridine, preferably at a temperature about 130–160° to provide the 8 acyl compound. The reaction is then run directly into ice or, alternatively, the excess acylation agent is partially distilled off then run into ice to decompose the excess of anhydride and precipitate the solid ester. After filtering with suction and washing with water, the corresponding solid ester is obtained.

When the acylation agent used for acylating the 5,7-dihalogeno-8-hydroxyquinaldine is an acid chloride of Formula IVb or a mixture of an acid chloride of Formula IVb and acid anhydride of Formula IVa, the reaction is preferably carried out in such a way that the 5,7-dihalogeno-8-hydroxy-quinaldine together with the acid chloride is dissolved in an inert organic solvent, for example, in benzene, toluene, xylene or pyridine. The solution of the reactants is left to stand at room temperature or is heated at elevated temperature, for example, in a steam bath to produce the solid ester and finally the resulting ester is isolated and purified in accordance with the method outlined above for the acylation with acid anhydride.

In another aspect thereof the present invention relates to novel esters of 5,7-dibromo-8-hydroxyquinoline of the Formula V

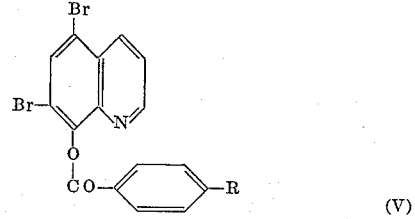

wherein R is a member selected from the group consisting of hydrogen, halogen and $NO_2$.

The above compounds of Formula V are prepared by reacting as starting material 5,7-dibromo-8-hydroxyquinoline with an acylating agent selected from the group consisting of acid anhydride of the Formula VIa,

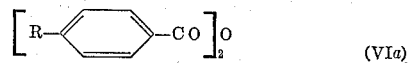

wherein R has the above significance; an acid chloride of the general Formula VIb

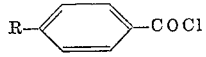 (VIb)

wherein R has the above significance and a mixture of acylating agent of Formulae VIa and VIb.

The last mentioned process may be carried out in a specific example by heating 5,7-dibromo-8-hydroxyquinoline with an acid anhydride of Formula VIa in the presence of a condensation catalyst, for example concentrated sulfuric acid or pyridine, preferably at a temperature of from 130 to 160° to provide the 8 acyl compound. The reaction solution is then run onto ice directly or, alternatively, the excess acylation agent is partially distilled off and then run onto ice to decompose the excess of anhydride and precipitate the solid ester. After filtering with suction and washing with water, the corresponding solid ester is obtained.

When the acylation agent used for acylating the 5,7-dibromo-8-hydroxyquinoline is an acid chloride of Formula VIb or a mixture of an acid chloride of Formula VIb and acid anhydride of Formula VIa, the reaction is preferably carried out in such a way that the 5,7-dibromo-8-hydroxyquinoline together with the acid chloride or the mixture of the acylation agents are dissolved in an inert organic solvent, for example benzene, toluene, xylene, methylene chloride, ethylene chloride, carbon tetrachloride to which, e.g., pyridine, triethylamine or dimethyl aniline are added. The resulting mixture is then stirred at room temperature or at elevated temperature, preferably that at which the solvent boils. The resulting esters are isolated and purified in accordance with known methods.

In another aspect thereof the present invention provides esters of 5-halogeno-8-hydroxyquinoline of the Formula VII

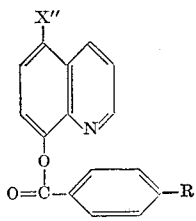 (VII)

wherein R is a member selected from the group consisting of hydrogen, chlorine and NO₂ and X″ is a radical selected from the group consisting of chlorine and iodine, and bromine.

The compounds of Formula VII of the present invention may be prepared by reacting a compound of the Formula VIII

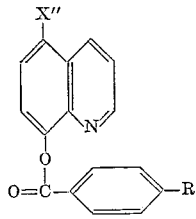 (VIII)

wherein R has the above significance, with chlorine or bromine to produce said Compound VII.

The compounds of Formula VII of this invention may also be prepared by esterifying 5-chloro- or 5-bromo-8-hydroxyquinoline with an acid anhydride or an acid halide of an organic acid of which the free acid has the general Formula IX

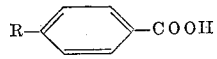 (IX)

wherein R has the above significance, or a mixture of such an acid anhydride and halide.

It should be noted that it is possible to produce the chlorine or bromine required for the reaction in situ.

Furthermore, this chlorination or bromination should be effected at a relatively low temperature, since the ester grouping is liable to become hydrolysed at temperatures above room temperature; preferably this halogenation is effected at a temperature of from 0 to −20° since this does not only minimise any tendency for the ester grouping to hydrolyse but also it results in the production of the required 5-chloro- or 5-bromo-ester without any appreciable amount of undesired other halogenation product.

The products of Formula VII are prepared by reacting a Compound VIII with bromine or chlorine in an inert organic solvent, for example ethylene chloride, trichloroethylene, chloroform, carbon tetrachloride or dimethylformamide, in the presence of a buffer or an acid binding agent, for example sodium acetate, sodium borate or sodium phosphate. After the reaction has gone to completion, any buffer or any unreacted acid binding agent present and inorganic salts formed during the reaction are removed by filtration, the unreacted halogen being removed by extraction with aqueous sodium bisulfite or sodium thiosulfate. The resulting Compound VIII is isolated and purified in accordance with known methods.

The products of Formula VII may also be prepared by heating 5-chloro- or 5-bromo-8-hydroxyquinoline with an acid anhydride of which the free acid has the Formula IX in the presence of an esterification catalyst, for example concentrated sulphuric acid or pyridine; the preferred temperature of heating is from 130 to 160°. The resulting Compound VII is isolated and purified in accordance with known methods.

The products of Formula VII may also be prepared by using an acid halide (the preferred acid halide is the acid chloride) of which the free acid has the Formula IX. For example 5-chloro- or 5-bromo-8-hydroxyquinoline with the acid halide are dissolved or suspended in an inert organic solvent, for example benzene, toluene, xylene, ethylene chloride, trichloroethylene, chloroform, carbon tetrachloride or dimethyl formamide, in the presence of an acid binding agent, for example pyridine, triethylamine, dimethyl aniline or sodium bicarbonate. The resulting suspension or solution is then stirred with or without heating. The resulting Compound VII is isolated and purified in accordance with known methods.

It is stressed that it is possible to use for acylating a mixture of the acid halide and acid anhydride mentioned above.

In another aspect thereof the present invention provides esters of 5-halogeno-8-hydroxyquinaldine of the Formula X

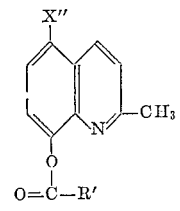 (X)

wherein R′ is a radical of the group consisting of alkyl containing 1 to 4 carbon atoms, phenyl, chlorophenyl and nitrophenyl and X″ is a radical selected from the group consisting of chlorine and iodine, and bromine.

The compounds of Formula X of the invention may be prepared by reacting a compound of the Formula XI

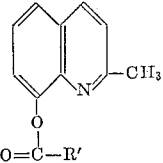 (XI)

wherein R′ has the above significance, with chlorine or bromine to produce said Compound X.

The compounds X of this invention may also be prepared by esterifying 5-chloro- or 5-bromo-8-hydroxyquinaldine with an acid anhydride or an acid halide of an organic acid of which the free acid has the Formula XII

R'—COOH            (XII)

wherein R' has the above significance, or a mixture of such an acid anhydride and halide.

It should be noted that it is possible to produce the chlorine or bromine required for the reaction in situ.

Furthermore, this chlorination or bromination should be effected at a relatively low temperature, since the ester grouping is liable to become hydrolysed at temperatures above room temperatures; preferably this halogenation is effected at a temperature of from 0 to −20° since this does not only minimise any tendency for the ester grouping to hydrolyse but also it results in the production of the required 5-chloro- or 5-bromo-ester without any appreciable amount of undesired other halogenation product.

The products of Formula X are prepared by reacting a Compound XI with bromine or chlorine in an inert organic solvent, for example, ethylene chloride, trichloroethylene, chloroform, carbon tetrachloride or dimethylformamide in the presence of a buffer or an acid binding agent, for example sodium acetate, sodium borate or sodium phosphate. After the reaction has gone to completion, any buffer or any unreacted acid binding agent present and inorganic salts formed during the reaction are removed by filtration, the unreacted halogen being removed by extraction with aqueous sodium bisulfite or sodium thiosulfate. The resulting Compound X is isolated and purified in accordance with known methods.

The products of Formula X may also be prepared by heating 5-chloro- or 5-bromo-8-hydroxyquinaldine with an acid anhydride or which the free acid has the Formula XII in presence of an esterification catalyst, for example concentrated sulfuric acid or pyridine; the preferred temperature of heating is from 130 to 160°. The resulting Compound X is isolated and purified in accordance with known methods.

The products of Formula X may also be prepared by using an acid halide (the preferred acid halide is the acid chloride) of which the free acid has the Formula XII. For example 5-chloro- or 5-bromo-8-hydroxyquinaldine with the acid halide are dissolved or suspended in an inert organic solvent, for example benzene, toluene, xylene, ethylene chloride, trichloroethylene, chloroform, carbon tetrachloride or dimethyl formamide, in the presence of an acid binding agent, for example pyridine, triethylamine, dimethyl aniline or sodium bicarbonate. The resulting suspension or solution is then stirred with or without heating. The resulting Compound X is isolated and purified in accordance with known methods.

It is stressed that it is possible to use for acylating a mixture of the acid halide and acid anhydride mentioned above.

The new compounds of Formula I of the present invention are bases which are solid at room temperature. They are much less soluble in water than the corresponding free hydroxy compounds from which they are made and for this reason are resorbed less well than the latter.

The new compounds of Formula I of the invention have highly favorable properties making them especially useful as surface antiseptics; due to their limited water-solubility and low resorbability the esters of Formula I assure particularly good systemic compatibility for antiseptic use. Further the compounds of Formula I are useful as new intermediate products for the production of pharmaceuticals which are antiseptic in character. The compounds exemplified herein have excellent antiseptic action against pathogenic organisms and against pathogenic parasites.

The new compounds of Formula II of the present invention are bases which are solid at room temperature. They are much less soluble in water than the corresponding free hydroxy compounds from which they are made and for this reason are resorbed less well than the latter.

The new compounds of Formula II of the invention have highly favorable properties making them especially useful as surface antiseptics; due to their limited water-solubility and low resorbability the esters of Formula II assure particularly good systematic compatibility for antiseptic use. Further the compounds of Formula II are useful as new intermediate products for the production of pharmaceuticals which are antiseptic in character. The compounds exemplified herein have excellent antiseptic action against pathogenic organisms and against pathogenic parasites.

The new compounds of Formula V of the present invention are bases which are solid at room temperature.

The new compounds of Formula V of the invention have highly favorable properties making them especially useful as fungicidies or disinfectants; due to their limited water-solubility and low resorbability the esters of Formula V assure particularly good systematic compatibility for antiseptic use. Further the compounds of Formula V are useful as new intermediate products for the production of fungicides and disinfectants. The compounds exemplified herein have excellent antiseptic action against pathogenic organisms and against pathogenic parasites.

The compounds VII are solid bases which are less soluble in water than 5-chloro- or 5-bromo-8-hydroxyquinoline and therefore are less easily resorbed. They have highly favorable properties making them especially useful as surface antiseptics; due to their limited water-solubility and low resorbability the new compounds assure particularly good systematic compatibility for antiseptic use. Further the compounds of Formula VII are useful as new intermediate products for the production of pharmaceuticals which are antiseptic in character. The compound exemplified herein have excellent antiseptic action against pathogenic organisms and against pathogenic parasites.

The Compounds X are solid bases which are less soluble in water than 5-chloro- or 5-bromo-8-hydroxyquinaldine and therefore are less easily resorbed. They have highly favorable properties making them especially useful as surface antiseptics; due to their limited water-solubility and low resorbability the new compounds assure particularly good systematic compatibility for antiseptic use. Further the compounds of Formula X are useful as new intermediate products for the production of pharmaceuticals which are antiseptic in character. The compounds exemplified herein have excellent antiseptic action against pathogenic organisms and against pathogenic parasites.

EXAMPLE I

*5,7-Dibromo-8-(p-Chlorobenzoyloxy)-Quinaldine*

To a suspension of 3.7 g. of 5,7-dibromo-8-hydroxyquinaldine (melting point 125–126°), 8 cc. of pyridine and 160 cc. of ethylene chloride there is added at room temperature 19.2 g. of p-chloro-benzoyl chloride (boiling point 97–100°/12 mm. of Hg) while stirring, the addition being effected dropwise. Crude 5,7-dibromo-8-(p-chlorobenzoyloxy)-quinaldine is obtained; after repeated recrystallization of the substance from carbon tetrachloride and then from benzene, the analytically pure base is obtained with a constant melting point of 148–150°.

EXAMPLE II

*5-Chloro-7-Bromo-8-(p-Nitrobenzoyloxy)-Quinaldine*

A suspension of 40.8 g. of 5-chloro-7-bromo-8-hydroxyquinaldine (melting point 113–114°), 12 cc. of pyridine, 1000 cc. of carbon tetrachloride and 29.3 g. of p-nitrobenzoyl chloride (melting point 72°) is stirred for 4 hours at an inner temperature of 50°. Crude 5-chloro-7 - bromo - 8 -(p - nitrobenzoyloxy) - quinaldine is obtained; after repeated recrystallization of the material from carbon tetrachloride, the analytically pure base having a constant melting point of 155–157° results.

EXAMPLE III

5,7-Dichloro-8-(p-Nitrobenzoyloxy)-Quinaldine

A suspension of 12.8 g. of 5,7-dichloro-8-hydroxyquinaldine (melting point 111–112°), 4.5 g. of pyridine, 150 cc. of ethylene chloride and 10.9 g. of p-nitrobenzoyl chloride (melting point 72°) is stirred at a bath temperature of 50° for 4 hours. Crude, 5,7-dichloro-8-(p-nitrobenzoyloxy)-quinaldine is obtained; after repeated recrystallization of the material from carbon tetrachloride, the analytically pure base having a constant melting point of 163–164° results.

EXAMPLE IV

3-Methyl-5,7-Dibromo-8-(p-Chlorobenzoyloxy)-Quinaldine 1.0 g. of 3-methyl-5,7-dibromo-8-hydroxyquinaldine is dissolved in 2.0 cc. of pyridine and 0.795 g. of p-chlorobenzoyl chloride are added while cooling with ice. The required base is obtained as in Example 15 and after recrystallizing several times from acetone, analytically pure 3-methyl-5,7-dibromo-8-(p-chlorobenzoyloxy)-quinaldine has a constant melting point of 172–173°.

EXAMPLE V

5-Chloro-7-Bromo-8-(p-Chlorobenzoyloxy)-Quinaldine

To a suspension of 27.2 g. of 5-chloro-7-bromo-8-hydroxyquinaldine (melting point 113–114°), 10.1 g. of triethylamine and 250 cc. of benzene there is added dropwise at room temperature 19.2 g. of p-chlorobenzoyl chloride (boiling point 97–100°/12 mm. of Hg). The material is then stirred at a bath temperature of 50° for 4 hours. The resulting triethylamine hydrochloride is filtered off with suction, washed with 100 cc. of benzene and the filtrate is evaporated in a vacuum to dryness. The resulting crude 5-chloro-7-bromo-8-(p-chlorobenzoyloxy)-quinaldine is recrystallized twice from carbon tetrachloride to give the analytically pure base having a constant melting point of 114–146°.

EXAMPLE VI

5,7-Dibromo-8-(p-Chlorobenzoyloxy)-Quinoline 19.2 g. of p-chlorobenzoyl chloride (B.P. 97–100°/12 mm. of Hg) is added dropwise at room temperature while stirring to a suspension of 30.2 g. of 5,7-dibromo-8-hydroxyquinoline, 14 cc. of triethylamine and 220 cc. of xylene. Heating to the boil at reflux at a bath temperature of 165° is effected for 4 hours while stirring. The resulting triethylamine hydrochloride is filtered off with suction and washing with 100 cc. of benzene is effected. The filtrate is reduced to dryness in a vacuum, whereby crude 5,7-dibromo-8-(p-chlorobenzoyloxy)-quinoline of M.P. 135–138° results. After recrystallizing twice from benzene, the analytically pure substance has a constant M.P. of 136–138°.

EXAMPLE VII

5,7-Dibromo-8-(p-Nitrobenzoyloxy)-Quinoline

A suspension of 30.2 g. of 5,7-dibromo-80 hydroxyquinoline, 14 cc. of triethylamine and 18.6 g. of p-nitrobenzoyl chloride (M.P. 72°) in 1.5 litre of xylene is stirred for 8 hours at an inner temperature of 50°. The precipitated triethylamine chloride is filtered off with suction, washed with 100 cc. of benzene and the filtrate reduced to dryness in a vacuum. The residue is boiled with 750 cc. of petroleum ether to remove traces of unreacted acylating agent. The resulting residue is recrystallized twice from carbon tetrachloride to give analytically pure 5,7-dibromo-8-(p-nitrobenzoyloxy)-quinoline having a constant M.P. of 188–189°.

EXAMPLE VIII

5-Chloro-8-(p-Chlorobenzoyloxy)-Quinaldine 19.2 cc. of p-chlorobenzoyl chloride (B.P. 97–100°/12 mm. Hg) are added dropwise at room temperature to a stirred solution of 19.3 g. of 5-chloro-8-hydroxyquinaldine (M.P. 65.5–66.5°), 10.1 g. of triethylamine and 250 cc. of ethylene chloride. The mixture is then stirred for 4 hours on a bath kept at 50°. The triethylamine hydrochloride thus formed is removed on a suction filter and washed with 100 cc. of benzene, the filtrate being concentrated in a vacuum until dry. The raw 5-chloro-8-(p-chlorobenzoyloxy)-quinaldine melts at 161–164°. By twice recrystallising the substance from carbon tetrachloride the analytically pure 5-chloro-8-(p-chlorobenzoyloxy)-quinaldine of constant M.P. 163–164° is obtained.

EXAMPLE IX

5-Chloro-8-(p-Nitrobenzoyloxy)-Quinaldine

A suspension of 5-chloro-8-hydroxyquinaldine (M.P. 65.5–66.5°), 10.1 g. of triethylamine, 300 cc. of ethylene chloride and 19.2 g. of p-nitro-benzoyl chloride (M.P. 72°) is stirred for four hours on a bath kept at 50°. The precipitated triethylamine hydrochloride is removed on a suction filter and washed with 100 cc. of benzene, the filtrate being concentrated in a vacuum until dry. The raw 5-chloro-8-(p-nitrobenzoyloxy)-quinaldine melts at 177–181°. By twice recrystallising the substance from carbon tetrachloride the analytically pure 5-chloro-8-(p-nitrobenzoyloxy)-quinaldine of constant M.P. 181–182° is obtained.

EXAMPLE X

5-Bromo-8-(p-Chlorobenzoyloxy)-Quinaldine 9.6 g. of p-chlorobenzoyl chloride (B.P. 97–100°/12 mm. Hg) are added dropwise at room temperature to a solution of 11.9 g. of 5-bromo-8-hydroxy-quinaldine (M.P. 68°), 7 cc. of triethylamine and 150 cc. of ethylene chloride. The mixture is then stirred for 4 hours on a bath kept at 50°. The triethylamine hydrochloride formed is removed on a suction filter and washed with 100 cc. of benzene, the filtrate being concentrated in a vacuum until dry. The raw 5-bromo-8-(p-chlorobenzoyloxy)-quinaldine melts at 166–169°. By twice recrystallising the substance from carbon tetrachloride the analytically pure 5-bromo-8-(p-chlorobenzoyloxy)-quinaldine of constant M.P. 168–170° is obtained.

EXAMPLE XI

5-Bromo-8-(p-Nitrobenzoyloxy)-Quinaldine

A dispersion of 23.8 g. of 5-bromo-8-hydroxyquinaldine (M.P. 68°), 7.9 g. of pyridine, 250 cc. of carbon tetrachloride and 19.5 g. of p-nitrobenzoylchloride (M.P. 72°) is stirred for 4 hours at an inside temperature of 50°. The reaction mixture is filtered with suction and the pyridine hydrochloride is washed with 100 cc. of benzene. The filtrate is concentrated in a vacuum until dry. By recrystallising from benzene the analytically pure 5-bromo-8-(p-nitrobenzoyloxy)-quinaldine of constant M.P. 194–196° is obtained.

EXAMPLE XII

5,7-Dichloro-8-Acetoxyquinaldine

A mixture of 20.0 g. of 5,7-dichloro-8-hydroxyquinaldine (melting point 110–112°) and 75.0 g. of acetic acid anhydride with 8 drops of concentrated sulfuric acid are heated in an oil bath to 160° for 3 hours. After cooling, the material is run in 500 g. of ice and after all the ice has melted the resulting precipitated material is filtered with suction and then is washed with ice water until the washings no longer show an acid reaction with litmus. After drying the crude product in a vacuum drying cupboard at 80° until constant weight has been achieved, it is recrystallized from petroleum ether (B.P. range 90–120°) to give analytically pure 5,7-dichloro-8-acetoxyquinaldine having a constant melting point of 103.5–105°.

EXAMPLE XIII

5,7-Dibromo-8-Acetoxyquinaldine (a) A mixture of 40 g. of 5,7-dibromo-8-hydroxyquinaldine (melting point 125–126°) and 100.0 g. of acetic acid anhydride with 8 drops of concentrated sulfuric acid are reacted and further treated as described in Example XII; the crude product is recrystallized from carbon tetrachloride to give analytically pure 5,7-dibromo-8-acetoxyquinaldine with a constant melting point of 125–127°.

(b) To a solution of 47.5 g. of 5,7-dibromo-8-hydroxyquinaldine (melting point 125–126°) in 100 cc. of pyridine there is added dropwise 17.7 g. of acetyl chloride (melting point 51–52°) while cooling with ice and shaking. After completion of the reaction, filtering off of the resulting pyridine hydrochloride and purification as in Example XII, analytically pure 5,7-dibromo-8-acetoxyquinaldine having a constant melting point of 125–127° is obtained.

EXAMPLE XIV

5-Chloro-7-Bromo-8-Acetoxyquinaldine

A mixture of 40 g. of 5-chloro-7-bromo-8-hydroxyquinaldine (melting point 113–114°) and 135 g. of acetic acid anhydride with 4 drops of concentrated sulfuric acid are heated in an oil bath to 160° for 3 hours. Analytically pure 5-chloro-7-bromo-8-acetoxyquinaldine having a constant melting point of 121–122° is obtained as described in Example XII.

EXAMPLE XV

5,7-Dibromo-8-Benzoyloxyquinaldine

To a solution of 47.5 g. of 5,7-dibromo-8-hydroxyquinaldine (melting point 125–126°) in 100 cc. of pyridine there is added while cooling with ice 31.6 g. of benzoyl chloride (boiling point 194–196°) in portions while shaking. Analytically pure 5,7-dibromo-8-benzoyloxyquinaldine having a constant melting point of 130–132° is obtained as described in Example XIIIb, recrystallization of the crude base being effected from benzene/petroleum ether (B.P. range 90–120°).

EXAMPLE XVI

5,7-Dibromo-8-Benzoyloxyquinaldine

To a suspension of 63.4 g. of 5,7-dibromo-8-hydroxyquinaldine (melting point 125–126°), 15.8 g. of pyridine and 300 cc. of carbon tetrachloride there are added dropwise while stirring and at room temperature 28.1 g. of benzoyl chloride. After recrystallizing repeatedly the crude base (which is obtained as described in Example XIIIb) from carbon tetrachloride, analytically pure 5,7-dibromo-8-benzoyloxyquinaldine with a constant melting point of 130–132° results.

EXAMPLE XVII

5,7-Diiodo-8-Acetoxyquinaldine

To a solution of 20.5 g. of 5,7-diiodo-8-hydroxyquinaldine (melting point 144–145°) in 20 cc. of pyridine there are added 50.0 g. of acetic anhydride and the material is heated to the boil at reflux for 5 hours in an oil bath at a temperature of 160°. Evaporation to dryness is then effected at 60° in a vacuum. The residue is rubbed with 50 cc. of ice water, 200 cc. of chloroform are then added and the chloroform portion is shaken out twice each time with 100 cc. of a 5% aqueous sodium bicarbonate solution. The chloroform portion washed twice each time with 50 cc. of water is dried over sodium sulfate, reduced in volume in a vacuum, whereby crude oily 5,7 - diiodo - 8-acetoxyquinaldine results. After repeated recrystallization of the substance from petroleum ether (B.P. range 90–120°), analytically pure 5,7-diiodo-8-acetoxyquinaldine having a constant melting point of 120–122° results.

EXAMPLE XVIII

5,7-Dichloro-8-Benzoyloxyquinaldine

To a solution of 34.2 g. of 5,7-dichloro-8-hydroxyquinaldine (melting point 111–112°) in 100 cc. of pyridine there is added while cooling with ice 32.7 g. of benzoyl chloride in portions while shaking. After repeated recrystallization of the crude base (which is obtained as described in Example XVII) from petroleum ether (B.P. range 90–120°), analytically pure 5,7-dichloro-8-benzoyloxyquinaldine having a constant melting point of 121–123° results.

EXAMPLE XIX

5,7-Dibromo-8-(p-Nitrobenzoyloxy)-Quinaldine

A suspension of 31.7 g. of 5,7-dibromo-8-hydroxyquinaldine (melting point 125–126°), 8 cc. of pyridine, 350 cc. of ethylene chloride and 18.6 g. of p-nitrobenzoyl chloride (melting point 72°) is stirred for 4 hours at a bath temperature of 50°. Crude 5,7-dibromo-8-(p-nitrobenzoyloxy)-quinaldine is obtained as in Example XIIIb; after repeated recrystallization of the substance from carbon tetrachloride, the analytically pure base with a constant melting point of 160.5–162° results.

EXAMPLE XX

5-Chloro-7-Bromo-8-Benzoyloxyquinaldine

To a suspension of 40.8 g. of 5 - chloro-7-bromo-8-hydroxyquinaldine (melting point 113–114°), 11.8 g. of pyridine and 500 cc. of carbon tetrachloride there is added at room temperature 22.1 g. of benzoyl chloride (boiling point 194–196°) while stirring, the addition being effected dropwise. Crude 5-chloro-7-bromo-8-benzoyloxyquinaldine is obtained as in Example XIIIb; after recrystallization of the substance from petroleum ether (B.P. range 90–120°), the analytically pure base having a constant melting point of 122–124° results.

EXAMPLE XXI

5,7-Dichloro-8-(p-Chlorobenzoyloxy)-Quinaldine

To a suspension of 22.8 g. of 5,7-dichloro-8-hydroxyquinaldine (melting point 111–112°), 8.0 g. of pyridine and 150 cc. of benzene there is added dropwise at room temperature 19.3 g. of p-chlorobenzoyl chloride (boiling point 97–100°/12 mm. of Hg) in 50 cc. of benzene while stirring. Crude 5,7 - dichloro - 8-(p-chlorobenzoyloxy)-quinaldine is obtained as in Example XIIIb; after recrystallizing the substance from carbon tetrachloride, the analytically pure base having a constant melting point of 139–141° results.

EXAMPLE XXII

3-Methyl-5,7-Dibromo-8-Acetoxyquinaldine

A mixture of 3.0 g. of 3 - methyl-5,7-dibromo-8-hydroxyquinaldine and 25 cc. of acetic acid anhydride with 3 drops of concentrated sulfuric acid is heated to the boil at reflux in an oil bath for 3 hours. Excess acetic acid anhydride is distilled off at a reduced pressure, the residue is dissolved in 50 cc. of hot ligroin, filtered and crystallized. The resulting crude product is crystallized from isopropanol and analytically pure 3-methyl-5,7-dibromo - 8-acetoxyquinaldine having a melting point of 134.5–135° results.

The starting material, 3-methyl-5,7-dibromo-8-hydroxyquinaldine is produced by the following procedure which does not form part of this example:

A solution of 10.0 g. of 3-methyl-8-hydroxyquinaldine (melting point 91–92°, produced by the condensation of o-aminophenol with α-methyl-croton-aldehyde) in 60 cc. of 85% formic acid is cooled to about 0° and 24 g. of bromine are added over a period of 5 hours while stirring. The reaction mixture is diluted with 120 cc. of water, 120 cc. of a 20% sodium bisulfite solution is added and stirring for a further hour is effected. The product is filtered off with suction, washed with approximately 2 litres of water and dried on earthen plates and crystallized from absolute ethanol. After further crystallization from the same solvent, analytically pure 3-methyl-5,7-dibromo-8-hydroxyquinaldine having a melting point of 148–149° results.

EXAMPLE XXIII

3-Methyl-5,7-Dibromo-8-Benzoyloxyquinaldine

To a solution of 1.0 g. of 3-methyl-5,7-dibromo-8-hydroxyquinaldine in 2.0 cc. of pyridine there is added 0.64 g. of benzoyl chloride while cooling in an ice bath. The material is left to stand for 17 hours at room temperature and evaporated to dryness in a vacuum. The evaporation residue is mixed with 5 cc. of ice water and extracted with chloroform. The extract washed with sodium hydrogen carbonate solution is dried over sodium sulfate and evaporated in a vacuum. Analytically pure recrystallized 3 - methyl - 5,7-dibromo-8-benzoyloxyquinaldine melts at 168.5–169.5°.

EXAMPLE XXIV

3-Methyl-5,7-Dibromo-8-(p-Nitrobenzoyloxy)-Quinaldine

To a solution of 1.0 g. of 3-methyl-5,7-dibromo-8-hydroxyquinaldine in 2.0 cc. of pyridine there is added 0.84 g. of p-nitrobenzoyl chloride while cooling with ice and the reaction mixture is left to stand for 15 hours. The required base is obtained as in Example XXIII; it is recrystallized from 85 cc. of ethyl acetate and in analytically pure form has a melting point of 193–193.5°.

EXAMPLE XXV

5,7-Diiodo-8-Benzoyloxyquinaldine

To a suspension of 6.0 g. of 5,7-diiodo-8-hydroxyquinaldine (melting point 144–145°) and 2.46 g. of sodium bicarbonate in 300 cc. of carbon tetrachloride there is added dropwise at room temperature 2.25 g. of benzoyl chloride (boiling point 194–196°). The material is then stirred at an inside temperature of 50° for 6 hours. The undissolved material is filtered off with suction, washed with 60 cc. of carbon tetrachloride and the filtrate is evaporated to dryness in a vacuum. The residue is taken up in 50 cc. of chloroform, extracted once with 20 cc. of cold 5% aqueous sodium bicarbonate solution and twice each time with 20 cc. of water. The aqueous portion is washed with two portions each of 20 cc. of chloroform and then discarded. The united chloroform portions are dried over sodium sulfate and evaporated to dryness in a vacuum. After recrystallizing the crude product three times from hexane, analytically pure 5,7-diiodo-8-benzoyloxyquinaldine with a constant melting point of 132–134° results.

EXAMPLE XXVI

5,7-Dibromo-8-Benzoyloxyquinoline 29.4 g. of benzoyl chloride (M.P. 194–196°) are added dropwise at room temperature while stirring to a suspension of 60.6 g. of 5,7-dibromo-8-hydroxyquinoline (M.P. 195–197°), 16.0 g. of pyridine and 420 cc. of xylene. Heating to the boil at reflux at a bath temperature of 140° while stirring is effected for 4 hours. After cooling to room temperature, the resulting pyridine hydrochloride is filtered off with suction, washing with 100 cc. of benzene is effected and the filtrate reduced to dryness in a vacuum. The resulting crude 5,7-dibromo-8-benzoyloxyquinoline has a M.P. of 131–139°. After repeated recrystallization from carbon tetrachloride, the analytically pure 5,7-dibromo-8-benzoyloxyquinoline has a constant M.P. of 140–142°.

EXAMPLE XXVII

5-Chloro-8-Benzoyloxyquinoline 9.5 g. of benzoyl chloride (B.P. 194–196°) are added dropwise at room temperature to a solution of 12.0 g. of 5-chloro-8-hydroxyquinoline (M.P. 124–125°), 5.5 g. of pyridine and 150 cc. of benzene, the solution being stirred. Stirring of the reaction mixture is continued for 4 hours on a bath at a temperature of 90°. The pyridine hydrochloride which forms is removed on a suction filter and washed with 100 cc. of benzene, whereas the filtrate is concentrated under reduced pressure until dry. The raw product is twice recrystallized from carbon tetrachloride and yields the analytically pure 5-chloro-8-benzoyloxyquinoline of constant M.P. 97–98.5°.

EXAMPLE XXVIII

5-Bromo-8-Benzoyloxyquinoline

In the course of 11 minutes 60.0 g. of bromine are added dropwise to a stirred solution, cooled in a brine ice mixture, of 37.3 g. of 8-benzoyloxyquinoline (M.P. 122–122.5°) in 350 cc. of chloroform in which 49.8 g. of anhydrous sodium acetate have been suspended. When all the bromine has been added the reaction mixture is stirred at 20° for 4½ hours. The solids are then removed on a suction filter and washed with a total of 250 cc. of chloroform. The filtrate is extracted first with 180 cc. of a 50% aqueous solution of sodium thiosulphate, then with 150 cc. of a 50% aqueous solution of sodium acetate and finally with a total of 450 cc. of water. The aqueous portions are washed out with a total of 200 cc. of chloroform. The combined chloroform portions are dried on sodium sulphate and then concentrated under reduced pressure until dry. The residue is recrystallized three times from cyclohexane and yields the 5-bromo-8-benzoyloxyquinoline of constant M.P. 117–119°.

EXAMPLE XXIX

5-Chloro-8-Benzoyloxyquinaldine

A mixture of 19.3 g. of 5-chloro-8-hydroxyquinaldine (M.P. 65.5–66.5°), 92.5 g. of acetic acid anhydride and 8 drops of concentrated sulfuric acid is heated for 3 hours on an oil bath kept at 160°. After having cooled, the entire mixture is poured onto 500 g. of ice and, as soon as all the ice has melted, the oily precipitate is taken up in 250 cc. of chloroform. This chloroform solution is extracted with a total of 200 cc. of a 5% aqueous solution of sodium bicarbonate and 100 cc. of water, the aqueous portions being washed with a total of 200 cc. of chloroform and the recombined chloroform portions dried on sodium sulfate. The whole is then concentrated in a vacuum until dry. By twice recrystallising the raw product from petroleum ether the analytically pure 5-chloro-8-acetoxyquinaldine of constant M.P. 81–82.5° is obtained.

EXAMPLE XXX

5-Chloro-8-Benzoyloxyquinaldine 29.5 g. of benzoyl chloride (B.P. 194–196°) are added dropwise at room temperature to a stirred solution of 40.7 g. of 5-chloro-8-hydroxyquinaldine (M.P. 65.5–66.5°), 17.0 cc. of pyridine and 250 cc. of ethylene chloride. The reaction mixture is then stirred for 4 hours on a bath at 50°. After having cooled to room temperature the pyridine hydrochloride formed is removed on a suction filter and washed with 100 cc. of benzene, the filtrate being concentrated in a vacuum until dry. The raw 5-chloro-8-benzoyloxyquinaldine melts at 91–94°. By twice recrystallising the substance from carbon tetrachloride the analytically pure 5-chloro-8-benzoyloxyquinaldine of constant M.P. 93–95° is obtained.

EXAMPLE XXXI

5-Bromo-8-Benzoyloxyquinaldine 10.5 g. benzoyl chloride (B.P. 194–196°) are added dropwise at room temperature to a solution of 17.8 g. of 5-bromo-8-hydroxyquinaldine (M.P. 68°), 5.9 g. of pyridine and 50 cc. of benzene. The mixture is stirred for 3 hours under reflux on a bath kept at 100°. The whole is then concentrated until dry, 100 cc. of water are added and the raw 5-bromo-8-benzoyloxyquinaldine is filtered with suction. After having been dried until its weight remains constant the substance has a M.P. of 99–102°. By twice recrystallising from benzene/petroleum ether the analytically pure 5-bromo-8-benzoyloxyquinaldine of constant M.P. 103–104° is obtained.

EXAMPLE XXXII

5-Chloro-8-Benzoyloxyquinaldine 328.0 g. of benzoyl chloride are added portionwise to a solution of 239.0 g. of 8-hydroxyquinaldine (M.P. 73–75°) in 350 cc. of pyridine the solution being at the same time cooled and swirled around. After having been allowed to stand with the exclusion of moisture for 4 hours the mixture is concentrated in a vacuum until its consistency is that of a viscous oil. This is taken up in 500 cc. of chloroform and extracted with a total of 750 cc. of a 5% aqueous solution of sodium bicarbonate and then with 500 cc. of water. The aqueous portions are washed with a total of 500 cc. of chloroform. The recombined chloroform portions are dried on sodium sulfate and concentrated in a vacuum until dry. The 8 - benzoyloxy - quinaldine distils at 162–170°/0.08 mm. Hg. After having been twice recrystallised from isopropanol the distillate yields the analytically pure 8-benzoyloxy-quinaldine of constant M.P. 76–79°.

26.6 g. of chlorine are introduced into a solution of 39.5 g. of 8-benzoyloxy-quinaldine (M.P. 76–79°) in 250 cc. of dimethyl formamide, while cooling and stirring in a brine ice bath, stirring being then continued at room temperature for another 30 minutes. Nitrogen is passed through the solution and 750 cc. of water are added gradually, the product precipitating first in greasy then in crystalline form. This is removed on a suction filter and washed with cold water until the filtrate ceases to be acid. The dried raw product is twice recrystallised from petroleum ether and yields the 5-chloro-8-benzoyloxyquinaldine of constant M.P. 93–95°.

EXAMPLE XXXIII

5-Bromo-8-Acetoxyquinaldine 160.0 g. of bromine are added dropwise in the course of 25 minutes to a solution of 80.4 g. of 8-acetoxyquinaldine (M.P. 63–64°) in 750 cc. of chloroform in which 133.0 g. of anhydrous sodium acetate have been suspended, the solution being at the same time stirred and cooled with a brine ice mixture, stirring being continued for another 2½ hours at a temperature of about 0°. The solids are removed on a suction filter and washed portionwise with a total of 1 litre of chloroform. The filtrate is shaken out first with a total of 1.4 litres of a 10% aqueous solution of sodium thiosulfate and then twice with 250 cc., i.e., a total of 500 cc. of water. These aqueous portions are discarded after further washing with 300 cc. of chloroform. The recombined chloroform portions are dried on sodium sulfate and then concentrated in a vacuum until dry. The residue is twice recrystallised from petroleum ether and yields the analytically pure 5-bromo-8-acetoxy-quinaldine of constant M.P. 83–85°.

EXAMPLE XXXIV

5-Bromo-8-Benzoyloxyquinaldine 60.0 g. of bromine are added dropwise in the course of 11 minutes to a stirred solution, cooled with a brine ice mixture, of 39.5 g. of 8-benzoyloxy-quinaldine (M.P. 76–79°) in 260 cc. of chloroform in which 49.8 g. of anhydrous sodium acetate have been suspended. When the bromine has been added stirring of the mixture is continued at room temperature for 4½ hours, the solid substance being then removed on a suction filter and washed with a total of 250 cc. of chloroform. The filtrate is extracted first with 180 cc. of a 50% aqueous solution of sodium thiosulphate, then with 150 cc. of a 50% aqueous solution of sodium acetate and finally with a total of 375 cc. of water. The aqueous portions are washed with a total of 200 cc. of chloroform. The recombined chloroform portions are dried on sodium sulfate and then concentrated in a vacuum until dry. The residue is twice recrystallised from petroleum ether and yields the 5-bromo-8-benzoyloxyquinaldine of constant M.P. 103–104°.

What we claim is:
1. 5,7-dibromo-8-(p-chlorobenzoyloxy)-quinaldine.
2. 5 - chloro - 7 - bromo - 8 - (p - nitrobenzoyloxy)-quinaldine.
3. 5,7-dichloro-8-(p-nitrobenzoyloxy)-quinaldine.
4. 3 - methyl - 5,7 - dibromo - 8 - (p - chlorobenzoyloxy)-quinaldine.
5. 5 - chloro - 7 - bromo - 8 - (p - chlorobenzoyloxy)-quinaldine.
6. 5,7-dibromo-8-(p-chlorobenzoyloxy)-quinoline.
7. 5,7-dibromo-8-(p-nitrobenzoyloxy)-quinoline.
8. 5-chloro-8-(p-chlorobenzoyloxy)-quinaldine.
9. 5-chloro-8-(p-nitrobenzoyloxy)-quinaldine.
10. 5-bromo-8-(p-chlorobenzoyloxy)-quinaldine.
11. 5-bromo-8-(p-nitrobenzoyloxy)-quinaldine.
12. 5-chloro-8-(p-chlorobenzoyloxy)-quinoline.
13. 5-chloro-8-(p-nitrobenzoyloxy)-quinoline.

References Cited in the file of this patent

UNITED STATES PATENTS 2,411,670    Senn _____ Nov. 26, 1946

OTHER REFERENCES

Nogradi, Ber. Deut. Chem., vol. 85, pp. 104–6 (1952).